United States Patent [19]

Bechara et al.

[11] Patent Number: 4,478,959
[45] Date of Patent: Oct. 23, 1984

[54] AMINO AND AMIDO DIVALENT METAL CARBOXYLATES USEFUL AS CATALYSTS FOR POLYURETHANE FORMULATIONS

[75] Inventors: Ibrahim S. Bechara, Macungie; Rocco L. Mascioli, Media, both of Pa.

[73] Assignee: Air Products and Chemicals, Inc., Allentown, Pa.

[21] Appl. No.: 537,471

[22] Filed: Sep. 29, 1983

[51] Int. Cl.³ .................. C08G 18/14; C08G 18/18; C07F 7/22

[52] U.S. Cl. .................. 521/124; 260/429.7; 260/429.9; 260/439 R; 528/52; 528/53; 544/64; 544/225; 544/226

[58] Field of Search .................. 521/124, 126; 528/52, 528/53; 544/64, 225, 226; 260/429.7, 429.9, 439 R

[56] References Cited

U.S. PATENT DOCUMENTS

| | | | |
|---|---|---|---|
| 2,820,053 | 1/1958 | Hotten | 260/471 |
| 3,164,557 | 1/1965 | Merten et al. | 260/2.5 |
| 3,365,477 | 1/1968 | Gee et al. | 260/429 |
| 3,681,271 | 8/1972 | Yokoo et al. | 260/2.5 |
| 3,703,484 | 11/1972 | Keshi et al. | 260/2.5 |
| 3,796,674 | 3/1974 | Lengnick et al. | 260/2.5 |
| 4,115,634 | 9/1978 | Bechara et al. | 521/126 |
| 4,200,699 | 4/1980 | Treadwell | 521/124 |
| 4,223,098 | 9/1980 | Treadwell | 521/116 |

FOREIGN PATENT DOCUMENTS 0060974 9/1982 European Pat. Off. .
899948 6/1962 United Kingdom .

Primary Examiner—Herbert S. Cockeram
Attorney, Agent, or Firm—Michael Leach; E. Eugene Innis; James C. Simmons

[57] ABSTRACT

Amino and amido carboxylates of divalent tin, zinc, cobalt and nickel which are useful as catalysts for polyurethane formulations. Such compounds correspond to either of the formulae:

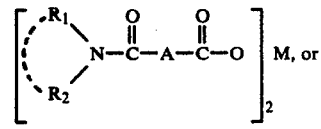

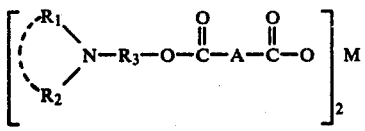

wherein $R_1$ and $R_2$ are independently $C_1$-$C_{20}$ alkyl, $C_6$-$C_{20}$ cyclohydrocarbyl, $C_2$-$C_{20}$ hydroxyalkyl or alkoxyalkyl, or $R_1$ and $R_2$ together with N form a nitrogen-containing heterocyclic ring of 5 or 6 atoms;

$R_3$ is a $-(CH_2)_n$ group where n is an integer from 2 to 6 or a

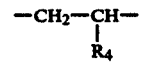

group where $R_4$ is an alkyl, cycloalkyl or aryl group of up to 6 carbon atoms;

A is

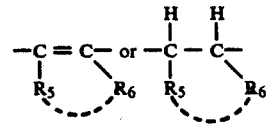

wherein $R_5$ and $R_6$ are independently hydrogen, $C_1$-$C_4$ alkyl or $R_5$ and $R_6$ together form part of a six-member cyclohydrocarbyl ring, and
M is divalent tin, zinc, cobalt or nickel.

21 Claims, No Drawings

AMINO AND AMIDO DIVALENT METAL CARBOXYLATES USEFUL AS CATALYSTS FOR POLYURETHANE FORMULATIONS

TECHNICAL FIELD

The invention relates to catalyzing the reaction between organic isocyanates and organic compounds containing an active hydrogen group. More particularly, the invention relates to the preparation of stable nitrogen-containing organo divalent metal catalysts for use in the production of polyurethanes.

BACKGROUND OF THE INVENTION

A wide variety of organotin compounds has been proposed for use as catalysts in the preparation of polyurethanes. Certain of these are in commercial use, either alone or as co-catalysts with tertiary amine catalysts. In one group of such organotin catalysts the tin atom is tetravalent meaning the tin atom is bonded to 2 hydrocarbon radicals and 2 other atoms which may be oxygen, nitrogen, or carbon. Representative patents showing such dialkyltin catalysts are the following:
U.S. Pat. No. 3,164,557
U.S. Pat. No. 3,681,271
U.S. Pat. No. 3,703,484
U.S. Pat. No. 3,796,674
UK Pat. No. 899,948

Another family of tin catalysts are the stannous (divalent tin) salts of carboxylic acids which are good "gellation" catalysts for the reactions leading to the formation of polyurethanes. However, these catalysts suffer from poor hydrolytic stability and lack of resistance to oxidation by air and, consequently, they must be stabilized by the addition of antioxidants and stored under an atmosphere of dry nitrogen.

Patents disclosing certain amido divalent metal carboxylates include U.S. Pat. Nos. 2,820,053 and 3,365,477.

SUMMARY OF THE INVENTION

In accordance with the present invention it has now been found that amino and amido divalent metal carboxylate compounds demonstrate catalytic activity and good stability. Such compounds correspond to either of the general formulae:

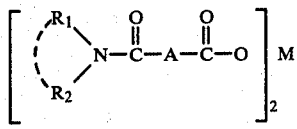

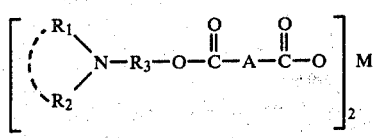

wherein $R_1$ and $R_2$ are independently $C_1-C_{20}$ alkyl, $C_6-C_{20}$ cyclohydrocarbyl, $C_2-C_{20}$ hydroxyalkyl or alkoxyalkyl, or $R_1$ and $R_2$ together with N form a nitrogen-containing heterocyclic ring of 5 or 6 atoms;

$R_3$ is a $-(CH_2)_n$ group where n equals an integer from 2 to 6 or a

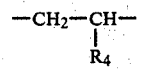

group where $R_4$ is alkyl, cycloalkyl or aryl group of up to 6 carbon atoms;

A is

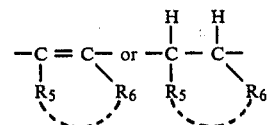

wherein $R_5$ and $R_6$ are independently hydrogen, $C_1-C_4$ alkyl, or $R_5$ and $R_6$ together with the carbon atoms to which they are bonded form a 6-member cyclohydrocarbyl group, and M is divalent tin, zinc, cobalt or nickel.

The invention comprises these compounds as well as methods and compositions for the use of these amino and amido divalent metal carboxylates as catalysts, alone or in combination with other catalysts, for isocyanate reaction with active hydrogen-containing compounds, such as in the preparation of polyurethanes.

DETAILED DESCRIPTION OF THE INVENTION

The compounds of the present invention can be prepared in three steps. In the first step, a secondary amine or a tertiary amino alcohol is reacted with an acid anhydride. Suitable amines and amino alcohols for the reaction have the following general formulas, respectively:

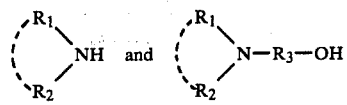

in which $R_1$ and $R_2$ are independently $C_1-C_{20}$ alkyl, $C_6-C_{20}$ cyclohydrocarbyl, $C_2-C_{20}$ hydroxyalkyl or alkoxyalkyl, or $R_1$ and $R_2$ together with N form a nitrogen-containing heterocyclic ring of 5 or 6 atoms. Preferably $R_1$ and $R_2$ are $C_1-C_4$ alkyl groups such as methyl, ethyl and butyl; $C_6$ cyclohydrocarbyl groups such as cyclohexyl, cyclohexenyl and phenyl; $C_2-C_4$ hydroxyalkyl groups such as hydroxyethyl and hydroxypropyl; and $R_1$ and $R_2$ together with N form morpholine, piperazine, piperidine and pyrrolidine.

$R_3$ in the formula for the amines and amino alcohols suitable for the invention represent a polymethylene group of 2 or 6 carbon atoms, preferably ethylene or propylene, or a

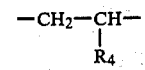

group where $R_4$ is an alkyl, cycloalkyl or aryl group of up to 6 carbon atoms, such as cyclohexyl, phenyl, ethyl, butyl, and methyl which is the preferred alkyl group.

Illustrative of the amines and amino alcohols that can be used in making the catalyst of the invention are dimethylamine, diethylamine, dibutylamine, methylethylamine, methyldecylamine, decyloctadecylamine, morpholine, piperazine, piperidine, and pyrrolidine. Suitable amino alcohols include dimethylethanolamine, diethylethanolamine, dibutylpropanolamines, dimethylbutanolamines, N-hydroxyethyl morpholine, N-hydroxyethyl piperidine, and N-hydroxyisopropyl morpholine.

The above amines or amino alcohols are reacted with an organic acid anhydride of the formula

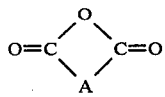

in which A is

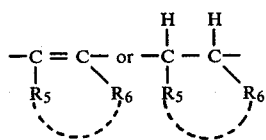

wherein $R_5$ and $R_6$ are independently hydrogen, $C_1-C_4$ alkyl or $R_5$ and $R_6$ together form part of a 6-member cyclohydrocarbyl group. The preferred alkyl group is methyl. The cyclohydrocarbyl groups may be cyclohexane, cyclohexene or benzene.

Representative of the organic acid anhydrides that can be reacted with the above amines or amino alcohols are succinic anhydride; maleic anhydride; 1,2-cyclohexane dicarboxylic acid anhydride; 1,2-cyclohexane-1 dicarboxylic acid anhydride; 1,2-cyclohexane-4 dicarboxylic acid anhydride; and phthalic anhydride.

The above-described amines or amino alcohols are reacted with the above-described acid anhydrides in accordance with the following equations:

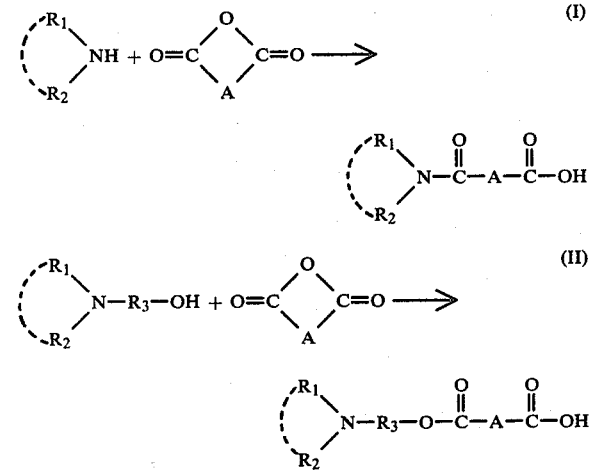

In the next step the compounds produced in equations I and II above are reacted with an alkali metal such as lithium, sodium or potassium to yield the alkali metal salt of the amino or amido carboxylate. Two moles of the alkali metal salt are then reacted with one mole of a salt of divalent tin, zinc, cobalt or nickel to yield the amino and amido divalent metal carboxylates of the invention.

The reaction of the amine or amino alcohol with the organic acid anhydride is suitably carried out in an inert solvent such as toluene under reflux. The alkali metal is then added to the inert solvent slowly and refluxing is continued until all hydrogen gas evolution from the reaction mixture has ceased. The recovered alkali metal salt is the dissolved in an appropriate solvent such as an alcohol and preferably with heating. The divalent metal salt, preferably a halide salt, is added and the reaction continued. Other divalent metal salts such as nitrate and sulfate may be used. The divalent metal is tin, zinc, nickel or cobalt with tin being preferred.

The compounds of the invention are useful for catalyzing the reaction between organic isocyanate compounds, preferably polyisocyanates, and organic compounds containing active hydrogens, preferably polyols. Polyisocyanates and polyols used in formulations for the preparation of polyurethanes are well known to those skilled in the art.

Examples of suitable polyisocyanates are hexamethylene diisocyanate, phenylene diisocyanate, toluene diisocyanate, and 4,4'-diphenylmethane diisocyanate. Especially suitable are the 2,4- and 2,6-toluenediisocyanates individually or together as their commercially availabe mixtures. Other suitable mixtures of diisocyanates are those known commercially as "crude MDI", also known as PAPI, which contain about 60% of 4,4'-diphenylmethane diisocyanate along with other isomeric and analogous higher polyisocyanates.

Illustrative of suitable polyols as a component of the polyurethane formulations of this invention are the polyhydric compounds including especially diols and triols. Specific compounds include, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol and like low molecular weight polyols.

Other suitable polyols are the polyalkylene ether and polyester polyols and these include the poly(alkylene oxide) polymers such as poly(ethylene oxide) and poly(propylene oxide) polymers and copolymers with terminal hydroxyl groups derived from the above-listed low molecular weight polyols and polyester polyols such as those produced by reacting a dicarboxylic acid with an excess of a diol, for example, adipic acid with ethylene glycol. Other suitable polyols for use in the compositions of this invention are amino polyols, as for example, those derived from toluenediamine, ethylenediamine, triethanolamine and the like via reaction with alkylene oxides.

Other typical agents found in the polyurethane formulations include blowing agents such as water, methylene chloride, trifluorochloromethane and the like, and cell stabilizers such as silicones.

The compounds of the invention are used in catalytically effective amounts, which amounts may range from about 0.1 to 1 part per 100 parts polyol in polyurethane formulations.

The following examples illustrate the preparation of compounds of the invention and their utility in making polyurethanes.

EXAMPLE 1

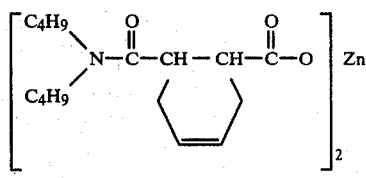

In a three neck round bottom flask fitted with a stirrer, reflux condenser and a thermometer was charged toluene (200 cc), 1,2-cyclohexene-4 dicarboxylic acid anhydride (152 g; 1 mole). The mixture was brought to reflux and then dibutylamine (129.2 g; 1 mole) was added over a period of 20 to 45 minutes. After the addition of the amine was completed, sodium metal (23 g; 1 mole) was added slowly in small chunks. Refluxing was continued while hydrogen gas was being liberated until all the sodium had dissolved into a paste-like material and until all gas evolution from the reaction mixture ceased. The toluene was removed under reduced pressure leaving the residual sodium salt (about 300 g).

The sodium salt (150 g) was charged to a three neck round bottomed glass and isopropanol (200 cc) was added. The mixture was refluxed with stirring until most of the sodium salt dissolved and a pale milky-like solution was obtained. A predissolved solution of zinc chloride (34 g) and isopropanol (150 cc) was added to the milky solution of the sodium salt without heating. After the addition of the zinc chloride was completed, the mixture was heated at reflux for a total of 14 hours, then cooled and filtered to remove the sodium chloride (23.5 g). The isopropanol was removed from the filtrate at 85° C. under vacuum. A white solid product (150.8 g) was obtained. Analysis for zinc metal content in wt%: Found 10.48; calculated 10.30.

EXAMPLE 2

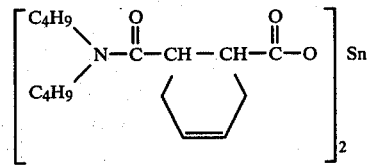

The sodium salt (135.5 g) from Example 1 was charged into a flask, isopropanol (200 cc) was added and the mixture was heated as in Example 1. When a "milky solution" was obtained, anhydrous stannous chloride (12.2 g) dissolved in isopropanol (250 cc) was added and the same procedure as in Example 1 was followed. Sodium chloride (29 g) was filtered off.

The clear viscous (thick syrup-like) product (150 g) solidified on standing and had an uncorrect melting point range of 80°-83° C. Analysis for tin content on a wt% basis: Found 15.78; calculated 17. Based on the tin analysis and the low melting point, it is concluded that this product contains impurities. See Example 5 for preferred procedure.

EXAMPLE 3

This example shows the preparation of an amino acid alkali salt.

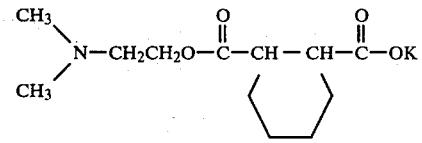

Into a round bottomed flask fitted with a stirrer, reflux condenser, a Dean-Stark trap and addition funnel, toluene (500 cc) and 1,2-cyclohexane dicarboxylic acid anhydride (305.4 g; 2 moles) were added. The mixture was brought to reflux and dimethylethanolamine [DMEA] (170 g; 2 moles) was added over a period of 20 to 45 minutes. Refluxing was maintained for 12 hours at which time water (15 cc) had collected in the trap. To this anhydrous solution potassium metal (83.2 g; about 2 moles) was added slowly in small chunks while stirring and refluxing continued for 8 hours. When hydrogen evolution had ceased, the toluene was removed under reduced pressure yielding a potassium salt residue for subsequent reactions.

EXAMPLE 4

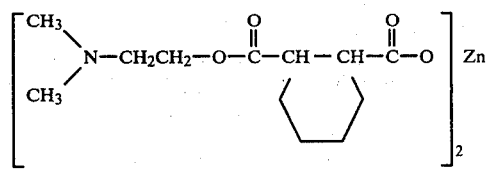

The potassium salt (69.7 g; ¼ mole) from Example 3 was added to dimethylethanolamine (300 cc) in a round bottomed flask and stirred until a yellow milky mixture was obtained. Zinc chloride (174.4 g; ⅛ mole) in dimethylethanolamine (200 cc) was added. The mixture was warmed and stirred for 2 hours, then refluxed for 2.5 hours and allowed to stand over night. Potassium chloride was filtered off and the filtrate subjected to heating and reduced pressure to recover the dimethylethanolamine and yielded a residue (63 g). Analysis of the oily product for zinc content showed zinc wt%: Found 11.52; Calculated 1200.

EXAMPLE 5

This example shows the preparation of an amido stannous carboxylate.

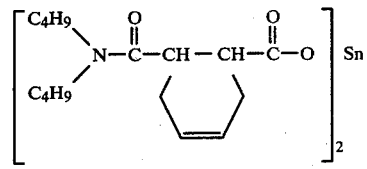

Sodium salt of the amido acid of Example 1 (131.5 g; ½ mole) was dissolved in isopropanol (400 cc) and heated to reflux in a 1 liter flask with a Dean-Stark trap. Anhydrous stannous chloride (48 g; ¼ mole) dissolved in isopropanol (200 cc) was added to the solution of the sodium salt of the amido carboxylic acid. The mixture was heated to reflux for 7 hours, then allowed to stand over night. The cold reaction mixture was filtered to remove sodium chloride (33.1 g) and the filtrate was stripped under reduced pressure to remove all the isopropanol. The residual product (177.8 g) was triturated with acetone to precipitate a white crystalline material that melted at 170°–175° C. The crystalline material was analyzed for tin and was found to contain 17.16 wt%. Calculated wt% tin for the stannous amido carboxylate is 17.53%.

EXAMPLES 6–7

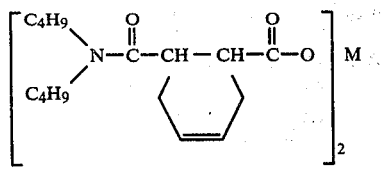

M = Ni or Co

The same procedure as in Example 5 was followed except that instead of stannous chloride, nickel chloride and cobaltous chloride were used. The analysis for metal content was as follows:

|  | FOUND | CALCULATED |
|---|---|---|
| Ni (wt %) | 8.97 | 9.49 |
| Co (wt %) | 8.33 | 9.50 |

EXAMPLES 8–10

These examples demonstrate the utility of the compounds of the invention. Two flexible foam formulations were chosen for evaluation of these catalysts. The formulations are shown in Table 1.

TABLE 1

| Flexible Foam Formulations | | |
|---|---|---|
|  | I | II |
| Voranol 3010[a] | 100 | 100 |
| Water | 4.5 | 4.5 |
| Silicone L-6202[b] | 1.0 | 1.0 |
| Freon 11B[c] | — | 5 |
| Methylene Chloride | 5 | — |
| TDI[d] | 60.2 | 60.2 |
| Isocyanate Index | 110 | 110 |

[a]Voranol 3010 is a triol of 3,000 m.wt.; hydroxy no. 54.4–58.4; marketed by Dow Chemical Company.
[b]Silicone L-6202 is a surfactant marketed by Union Carbide.
[c]Freon 11B is trifluorochloromethane marketed by DuPont.
[d]Toluene diisocyanate.

The catalytic activity of some of the compounds of the invention in formulations I and II were compared to the activity of stannous octoate and are shown in Tables 2 and 3, respectively.

TABLE 2

| Catalytic Activity in Formulation I | | | | |
|---|---|---|---|---|
| CATALYST | Conc. in pph | | | |
| DABCO ® TL[e] | 0.15 | 0.15 | 0.15 | 0.15 |
| Stannous Octoate | 0.2 | — | — | — |
| Organo Zinc of Ex. 4 | — | 0.2 | — | 0.6 |
| Organo Nickel of Ex. 6 | — | — | 0.2 | — |
| Activity, time in Secs. | | | | |
| Initiation | 12 | 12 | 14 | 10 |
| Rise | 93 | 83 | 215 | 72 |
| Gel | 125 | >300 | >300 | 80 |

[e]DABCO TL is a tertiary amine catalyst marketed by Air Products and Chemicals, Inc.

Table 2 shows that the zinc amino carboxylate of the invention is a superior blowing catalyst compared to stannous octoate while the nickel amido carboxylate was inferior. The zinc amino carboxylate can also be used as the sole catalyst, i.e. without an amino co-catalyst.

TABLE 3

| Catalytic Activity in Formulation II | | | |
|---|---|---|---|
| CATALYST | Conc. in pph | | |
| DABCO ® TL | 0.1 | 0.1 | 0.1 |
| Stannous Octoate | 0.2 | — | — |
| Stannous Amido Carboxylate (Ex.2) | — | 0.5 | — |
| Zinc Amido Carboxylate (Ex.1) | — | — | 0.5 |
| Activity, Time in Secs. | | | |
| Initiation | 14 | 12 | 13 |
| Rise | 135 | 120 | 160 |
| Gel | 205 | 175 | 420 |

Although the zinc compounds were shown as not being a good gelling catalyst, they were good blowing catalysts. Interestingly, after the rise the foamed formulation was relatively stable in that it seemed to maintain its integrity even though it took a long time thereafter to gel.

The amido and amino functional groups in the compounds of this invention may form a complex with the metal ion thereby slowing the initial activity of the catalysts in making them more responsive to change in temperature.

These functional groups may also stabilize the tin against oxidation and enhance the hydrolytic stability.

STATEMENT OF INDUSTRIAL APPLICATION

The amido and amino divalent metal carboxylates of the invention are useful as catalysts in the preparation of polyurethanes.

We claim:

1. Compounds corresponding to either of the formulae:

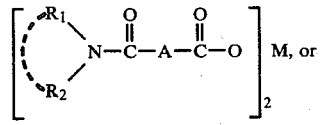

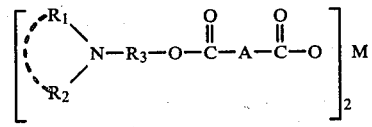

wherein $R_1$ and $R_2$ are independently $C_1$–$C_{20}$ alkyl, $C_6$–$C_{20}$ cyclohydrocarbyl, $C_2$–$C_{20}$ hydroxyalkyl or alkoxyalkyl, or $R_1$ and $R_2$ together with N form a nitrogen-containing heterocyclic ring of 5 or 6 atoms;

$R_3$ is a —$(CH_2)_n$— group where n is an integer from 2 or 6 or a

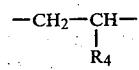

group where $R_4$ is an alkyl, cycloalkyl or aryl group of up to 6 carbon atoms;

A is

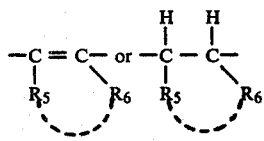

wherein $R_5$ and $R_6$ are independently hydrogen, $C_1-C_4$ alkyl or $R_5$ and $R_6$ together form part of a six-member cyclohydrocarbyl ring, and M is divalent tin, zinc, cobalt or nickel.

2. The compounds of claim 1 in which $R_1$ and $R_2$ are a $C_1-C_4$ alkyl group, a $C_6$ cyclohydrocarbyl group, a $C_2-C_4$ hydroxylalkyl group or $R_1$ and $R_2$ together with N form a nitrogen-containing heterocyclic ring which is morpholine or piperazine; $R_3$ is ethylene or propylene; $R_5$ and $R_6$ are hydrogen or together form a part of a six-member cyclohydrocarbyl group which is cyclohexane, cyclohexene or benzene.

3. The compounds of claim 2 in which $R_1$ and $R_2$ are methyl or butyl and $R_3$ is ethylene.

4. The compound of claim 1 which is

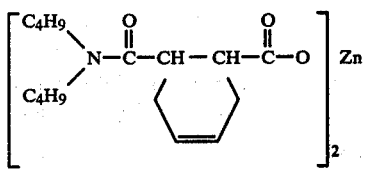

5. The compound of claim 1 which is

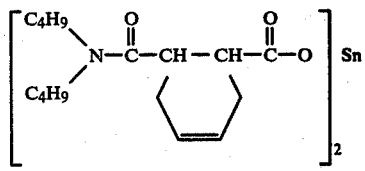

6. The compound of claim 1 which is

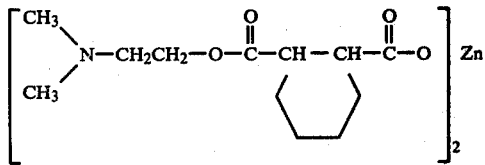

7. The compounds of claim 1 which are

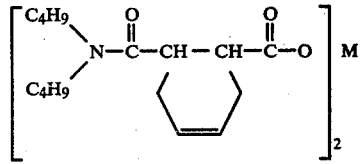

where M is nickel or cobalt.

8. A method for catalyzing the reaction between an organic isocyanate and an organic compound having an active hydrogen which comprises reacting the organic isocyanate and the active hydrogen compound in the presence of a catalytic amount of the compound of claim 1.

9. A method for catalyzing the reaction between an organic isocyanate and an organic compound having an active hydrogen which comprises reacting the organic isocyanate and the active hydrogen compound in the presence of a catalytic amount of the compound of claim 2.

10. A method for catalyzing the reaction between an organic isocyanate and an organic compound having an active hydrogen which comprises reacting the organic isocyanate and the active hydrogen compound in the presence of a catalytic amount of the compound of claim 3.

11. A method for catalyzing the reaction between an organic isocyanate and an organic compound having an active hydrogen which comprises reacting the organic isocyanate and the active hydrogen compound in the presence of a catalytic amount of the compound of claim 4.

12. A method for catalyzing the reaction between an organic isocyanate and an organic compound having an active hydrogen which comprises reacting the organic isocyanate and the active hydrogen compound in the presence of a catalytic amount of the compound of claim 5.

13. A method for catalyzing the reaction between an organic isocyanate and an organic compound having an active hydrogen which comprises reacting the organic isocyanate and the active hydrogen compound in the presence of a catalytic amount of the compound of claim 6.

14. A method for catalyzing the reaction between an organic isocyanate and an organic compound having an active hydrogen which comprises reacting the organic isocyanate and the active hydrogen compound in the presence of a catalytic amount of the compound of claim 7.

15. A composition for the preparation of a polyurethane comprising an organic polyisocyanate, a polyol, and a catalytic amount of the compound of claim 1.

16. A composition for the preparation of a polyurethane comprising an organic polyisocyanate, a polyol, and a catalytic amount of the compound of claim 2.

17. A composition for the preparation of a polyurethane comprising an organic polyisocyanate, a polyol, and a catalytic amount of the compound of claim 3.

18. A composition for the preparation of a polyurethane comprising an organic polyisocyanate, a polyol, and a catalytic amount of the compound of claim 4.

19. A composition for the preparation of a polyurethane comprising an organic polyisocyanate, a polyol, and a catalytic amount of the compound of claim 5.

20. A composition for the preparation of a polyurethane comprising an organic polyisocyanate, a polyol, and a catalytic amount of the compound of claim 6.

21. A composition for the preparation of a polyurethane comprising an organic polyisocyanate, a polyol, and a catalytic amount of the compound of claim 7.

* * * * *